United States Patent [19]
Suzuki

[11] Patent Number: 5,396,767
[45] Date of Patent: Mar. 14, 1995

[54] ENGINE EXHAUST GAS CLEANING SYSTEM

[75] Inventor: Hiromi Suzuki, Iwata, Japan

[73] Assignee: Yamaha Hatsudoki Kabushiki Kaisha, Iwata, Japan

[21] Appl. No.: 14,654

[22] Filed: Feb. 8, 1993

[30] Foreign Application Priority Data

Apr. 6, 1992 [JP] Japan .................. 4-112391

[51] Int. Cl.⁶ .............................................. F01N 3/30
[52] U.S. Cl. ........................................ 60/298; 60/299;
60/308; 422/172
[58] Field of Search ................. 60/298, 299, 308;
422/172

[56] References Cited

U.S. PATENT DOCUMENTS

| | | | |
|---|---|---|---|
| 2,880,079 | 3/1959 | Cornelius | 60/298 |
| 3,061,416 | 10/1962 | Kazokas | 60/308 |
| 3,166,895 | 1/1965 | Slayter | 60/302 |
| 3,704,592 | 12/1972 | Panhard | 60/298 |
| 3,817,714 | 6/1974 | Wiley | 60/298 |
| 3,899,303 | 8/1975 | Gaysert | 60/298 |
| 5,014,510 | 5/1991 | Laimbock | 60/302 |
| 5,218,817 | 6/1993 | Urata | 60/299 |

FOREIGN PATENT DOCUMENTS 193710  11/1982  Japan ................. 60/299

OTHER PUBLICATIONS

Japanese-published utility model application 50-58115.

*Primary Examiner*—Douglas Hart
*Attorney, Agent, or Firm*—Knobbe, Martens, Olson & Bear

[57] ABSTRACT

An engine exhaust gas cleaning system including a converter section that is disposed at the rear end of the exhaust pipe and which has an outer shell that is surrounded by a further outer shell having a rearwardly disposed atmospheric air inlet and a forwardly disposed atmospheric air outlet that communicates with the inlet of the converter through a venturi section. This heats the air admitted to the converter and also insures that any exhaust sound or exhaust leakage will be disposed rearwardly.

10 Claims, 3 Drawing Sheets

5,396,767

ENGINE EXHAUST GAS CLEANING SYSTEM

BACKGROUND OF THE INVENTION

This invention relates to an engine exhaust gas cleaning system and more particularly to an improved arrangement for introducing secondary air to an exhaust gas catalyzer.

In order to control the emission of unwanted exhaust gas constituents, a wide variety of devices have been proposed. Frequently, catalytic converters are employed for treating the exhaust gases before their discharge to the atmosphere. As is well known, a catalytic converter must be operated at the appropriate temperature in order for it to effectively treat the exhaust gases.

For this reason, it has been proposed to place the catalytic converter as close to the exhaust ports of the engine as possible. However, frequently a single catalytic converter is not sufficient to provide all of the desired exhaust gas treatment. Therefore, it has been proposed to employ plural catalytic converters in series along the exhaust system.

Where this is done, the downstream catalytic converter will receive exhaust gases that have been previously treated. A converter in effect causes afterburning of the exhaust gases and this is one way in which their unwanted exhaust gas constituents are controlled. However, the downstream catalytic converter will not receive exhaust gases that are adequate to permit afterburning.

It has, therefore, been proposed to add supplemental air to the exhaust system between the upstream and downstream converters so that the downstream converter can effectively treat the exhaust gases. One way in which this is done is to provide an atmospheric air inlet to the downstream catalytic converter which will introduce air to the converter so as to permit more effective afterburning. This has been done by providing a jacket around the catalytic converter with the upstream end of the jacket being in communication with the atmosphere and the downstream end being in communication with the converter. This type of system has been proposed for use with motorcycles.

There are a number of disadvantages of this type of system. First, since the supplemental air is drawn from the atmosphere, there is a risk that the exhaust gases may flow back into the atmosphere through the supplemental air passage inlet. This problem can be particularly acute where the application is with a motorcycle since the air inlet is in proximity to rider of the motorcycle. In addition, exhaust gas sounds to emanate can the atmosphere through the supplemental air inlet.

In addition to the aforenoted defects, the atmospheric air which is drawn into the system will be cold and this can detract from the efficiency of the converter. That is, the drawing of cold atmospheric air into the converter can lower its temperature and make the system inefficient.

It is, therefore, a principal object to this invention to provide an improved engine exhaust gas cleaning system.

It is a further object to this invention to provide an improved engine exhaust gas cleaning system that employs supplemental air for a catalytic converter but wherein the supplemental air is drawn in such a way that exhaust gas noises and exhaust gases cannot be discharged to the atmosphere at an undesirable location.

It is a further object to this invention to provide an arrangement for introducing supplemental air to a catalytic converter wherein the supplemental air is preheated.

It is a still further object to this invention to provide an improved silencing system for the supplemental air drawn for a catalytic converter.

SUMMARY OF THE INVENTION

This invention is adapted to be embodied in a catalytic convertor for the exhaust gases of an internal combustion engine having an exhaust pipe. The catalytic converter has a converter section that is supported by an outer shell. The outer shell has an inlet portion for receiving exhaust gases from the exhaust pipe and an outlet for discharging exhaust gases to the atmosphere. A supplemental air conduit is provided for adding atmospheric air to the exhaust gases flowing through the converter section. This supplemental air conduit has an inlet end that is disposed in proximity to the outlet end of the outer shell and a discharge end which is disposed upstream of the converter section.

DETAILED DESCRIPTION OF THE PREFERRED EMBODIMENT OF THE INVENTION

Figure 1:
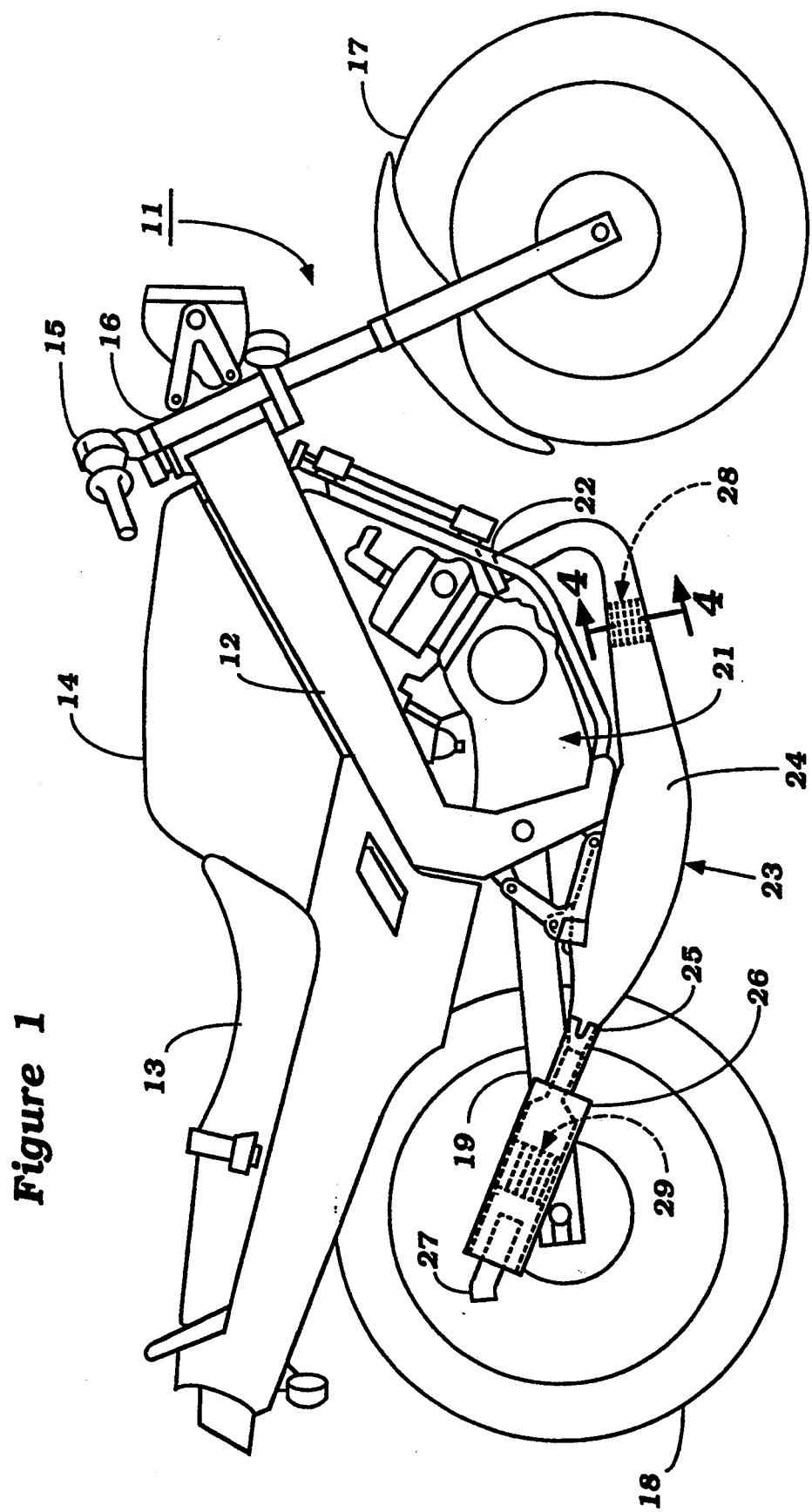
FIG. 1 is a side elevational view of a motorcycle having an exhaust gas cleaning system constructed in accordance with an embodiment of the invention.

Referring now in detail to the drawings and first to FIG. 1, a motorcycle having an exhaust system constructed in accordance with an embodiment of the invention is identified generally by the reference numeral 11. Although the invention is described in conjunction with a motorcycle, it can be used with other types of vehicular applications for internal combustion engines. The invention has, however, particular utility in conjunction with motorcycles because of their small size and the fact that the operator is exposed and will be readily cognizant of exhaust gases escaping in his proximity and exhaust noises in his proximity.

The motorcycle 11 is comprised of a frame assembly 12 of any known type which mounts a seat 13 rearwardly of a fuel tank 14. A handlebar assembly 15 is positioned at the front of the seat 13 and is journalled by a head pipe 16 of the frame 12 for steering of a front wheel 17 in a well known manner. The motorcycle 11 also includes a rear wheel 18 that is suspended by a trailing arm suspension 19 from the frame 12 in a known manner.

An internal combustion engine, indicated generally by the reference numeral 21 and which may in an illustrated embodiment, be comprised of a single cylinder, two cycle internal combustion engine is mounted in the frame 12 for driving the rear wheel 18. It is to be understood that the type of engine with which the invention is practiced is exemplary of only one of many types of applications. The invention does have particular utility with two cycle engines, however, due to the presence of oil in their exhaust gases which must be treated before it is discharged to the atmosphere so as to render it harmless.

As is well know, the motorcycle engine 21 includes a crankcase in which a change speed transmission is provided for driving the rear wheel 18. Since the construction of the motorcycle as thus far described may be considered to be conventional, further details of the motorcycle construction are not believed to be necessary to understand the construction and operation of the invention.

The engine 21 has a forwardly facing exhaust port 22 which delivers exhaust gases to an exhaust system, indicated generally by the reference numeral 23 which is comprised of a forward expansion chamber 24 which may also include, if desired some sound deadened or silencing arrangement. The expansion chamber 24 has a discharge end 25, the constructions of which will be described later by reference to FIG. 2, which delivers exhaust gases to a combined silencer catalytic converter and secondary air introducing device 26. This device 26 has a tail pipe 27 from which the exhaust gases are discharged to the atmosphere.

A catalytic converter 28 is provided in the expansion chamber 24 close to the exhaust port 22 so as to provide effective treatment of the exhaust gases. The catalytic converter 28 has a construction as will be described later by reference to FIG. 4.

Figure 2:
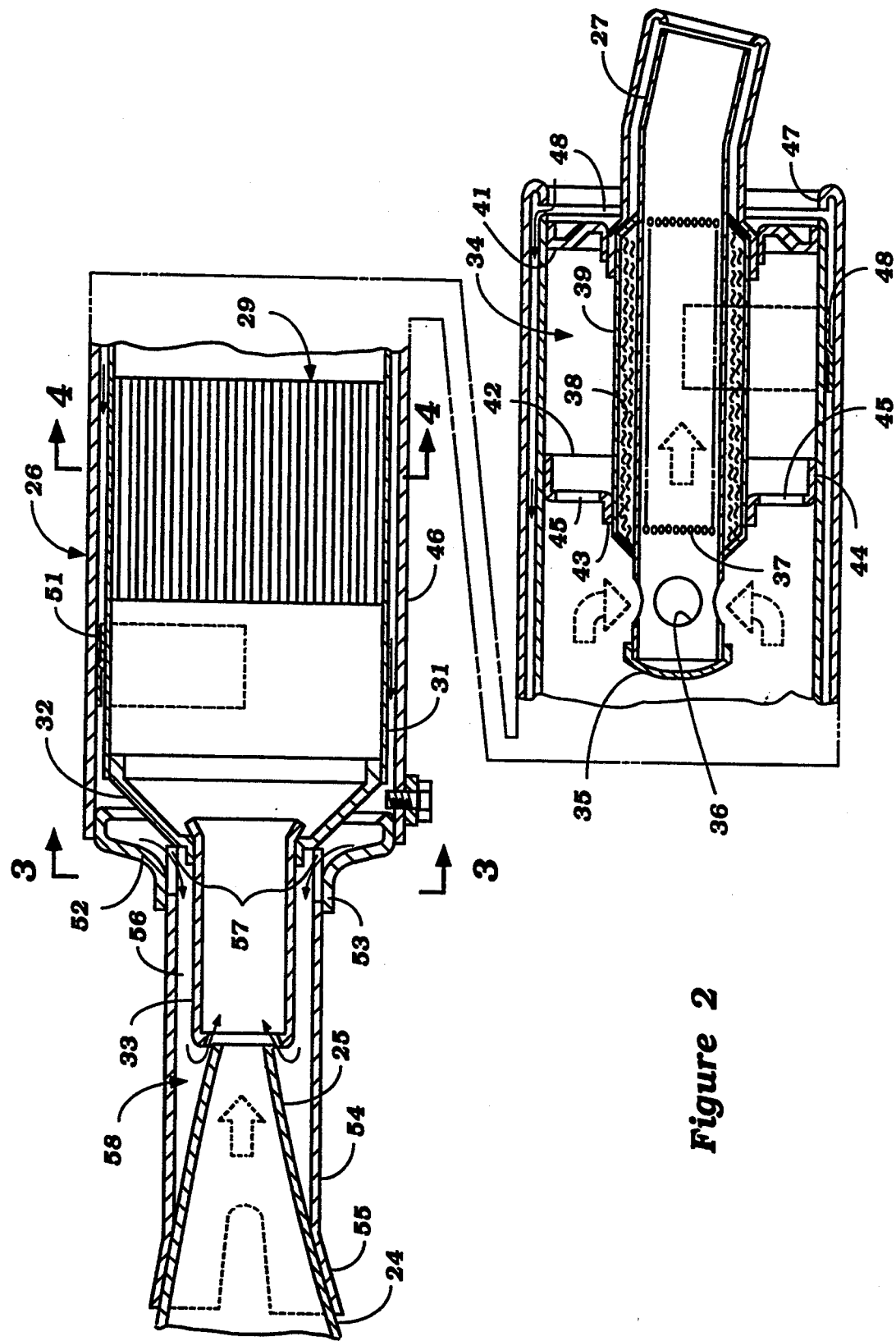
FIG. 2 is an enlarged cross sectional view of the downstream catalytic converter and silencing arrangement.
Figure 3:
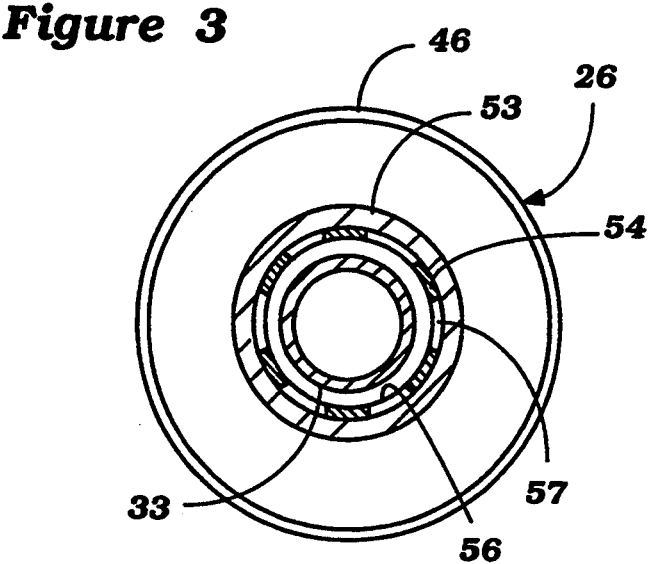
FIG. 3 is an enlarged cross sectional view taken along the line 3—3 of FIG. 2.
Figure 4:
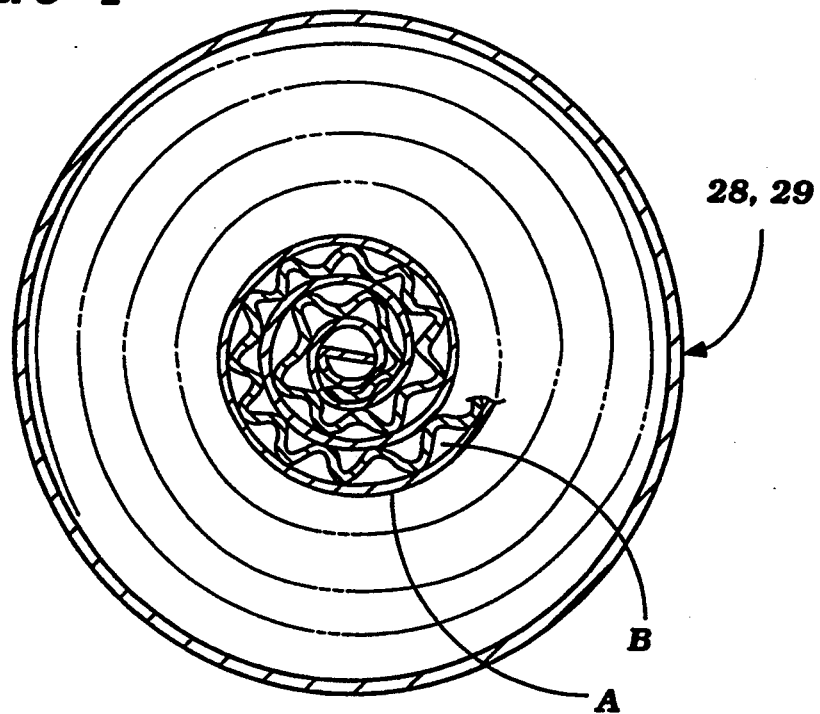
FIG. 4 is a typical cross sectional view taken along the lines 4—4 of FIG. 1 or 4—4 of FIG. 2 and shows the details of the construction of the upstream and downstream catalytic converters.

Referring now to FIGS. 2 and 3, the device 26 is comprised of a catalytic converter 28 which has a general construction like the catalyst bed 29 and which will be described later by reference to FIG. 4. This catalyst bed 29 is contained and supported within a shell 31 that is closed at its forward end by a header plate 32 which, in turn, supports an exhaust gas inlet tube 33 that is adapted to be positioned in proximity to the discharge end 25 of the expansion chamber 24, as previously noted. It will be seen that a small air gap is provided between the discharge end 25 of the expansion chamber 24 and the inlet tube 33 of the catalyst shell 31. The reason for this will be described later.

A silencing device, indicated generally by the reference numeral 34 is provided at the rear end of the shell 31. The silencing device 34 is comprised of an inner tube which consists of the tail pipe 27 and which extends forwardly and is capped by a closure plug 35 with a plurality of circumferentially spaced exhaust inlet openings 36 being formed therearound. The tail pipe 27 further has a perforated section 37 that is surrounded by a silencing material such as glass wool or the like 38 and which is held in place by a tubular outer shell 39 that is closed to the tail pipe 27 within the shell 31 between the inlet openings 36 and a rear header plate 41 which completes the outer shell.

A forward baffle plate 42 has a flange portion 43 that supports the outer shell 39 and an outer flange portion 44 that is affixed, as by welding, to the inner side of the outer shell 31. A plurality of openings 45 are formed in the baffle plate 42 so that the exhaust gases may communicate with an expansion chamber formed between the outer shells 39 and 31 and between the baffle plate 42 and the header plate 41 so as to further assist in silencing.

In accordance with the invention, an air inlet channel for receiving atmospheric air is provided by means of a further other shell 46 which has a reversely bent rear end 47 which is spaced from the outer shell 31 so as to provide an annular atmospheric air inlet 48 through which atmospheric air may be drawn as shown by the arrows in FIG. 2. This atmospheric air flows forwardly in the space between the shells 31 and 46 although its flow path may be interrupted by a plurality of arcuate baffles 49 and 51 that extend between the shells 31 and 46 on their lower and upper sides, respectively, as seen in FIG. 2 so as to provide a serpentine air flow path forwardly along not only the silencing device 34 but that outer periphery of the catalyst bed 29. As a result of this reverse flow, the atmospheric air that is drawn into the atmospheric air inlet 48 will be heated before it is introduced to the interior of the converter 26, in the manner now to be described.

A forward closure plate 52 closes the forward end of the shell 46 and, in turn, has a flange 53 that is sealingly engaged with a tube 54 which, in turn, has a forward flange 55 that is affixed, as by welding, to the converter discharge section 25. As a result, there will be formed an air channel 56 around the converter inlet pipe 33. Atmospheric air may flow into this channel 56 through a plurality of inlet openings 57 that are formed in the portion of the tube 54 contained within the flange 53 of the header plate 52. This air then flows through an opening 58 into the venturi section formed by the air gap between the inlet end of the tube 33 and the discharge end 25 of the expansion chamber 24. As a result, heated atmospheric air will be delivered to the converter 29 and this will improve the operational temperature and operating efficiency of the converter 29. In addition, any exhaust gases which may leak or exhaust pulses which may be transmitted back through this supplemental air inlet passage will be discharged at the opening 48 in proximity to the tail pipe 27 and away from the rider. In addition, the noise will not be significant due to this rear discharge even if any leakage or sound does escape.

The construction of the catalytic converter sections 28 and 29 will now be described by particular reference to FIG. 4. In the illustrated embodiment, the converter sections 28 and 29 are formed cylindrically in a generally honeycomb-like cross section by winding a flat band foil A and a corrugated band foil B spirally around each other. Both surfaces of either the flat band foil A or the corrugated band foil B are covered with a thin flat plate-like solder and the solder covered foil is then rolled with their fore and aft ends trued up and fixed together in a jig to form the band of honeycomb material. The rolled assembly is then heated in a furnace to cause the solder to bond the foils A and B to each other. After this, the column like member which is formed is soaked in a suspension mixed with the catalyst materials, such as platinum, palladium, copper, chromium, iron, nickel, etc. and alumina so that the catalytic substance may be carried on the column like member. Then the converter is completed by reducing and drying. Of course, the foregoing method is only one method in which the catalytic converters 28 and 29 may be formed. Various other methods can be employed in conjunction with the invention.

It should be readily apparent from the foregoing description, that with the described construction that not only the front converter 28 but the rear converter 29 can operate at maximum efficiency. The front converter 28 will be extremely efficient because it is in close proximity to the exhaust port 22 and received heated exhaust gases where further combustion may occur in proximity to the catalyst 28.

Even though the converter 29 is rearwardly positioned, the secondary air which drawn in flows around the outer periphery of the converter 29 and also the silencer 34 so that it will be heated before it flows into the venturi section formed between the opening of the inlet tube 33 of the converter shell and the discharge opening 25 of the expansion chamber 24. Thus, the gases will not only be heated but because of their rear inlet, any exhaust gas leakage which may occur will not be in proximity to the rider and the exhaust sounds which may leak also will be remotely positioned and hence, effective silencing is accomplished. It is to be understood, of course, that the foregoing description is that of a preferred embodiment of the invention and that various changes and modifications may be made without departing from the spirit and scope of the invention, as defined by the appended claims.

I claim:

1. A catalytic converter for the exhaust gases of an internal combustion engine having an exhaust pipe, said catalytic converter having a converter section formed by a first outer shell, said first outer shell having a tubular section closed at its ends by respective end plates, one of said end plates defining a tubular inlet end extending away from said one end plate for receiving exhaust gases from said exhaust pipe, the other of said end plates defining a tubular outlet end extending away from said other end plate and in an opposite direction from said tubular inlet end for discharging exhaust gases to the atmosphere, and a second outer shell for surrounding and supporting said first outer shell in spaced relation, one end of said second outer shell being formed with an exhaust gas inlet surrounding and spaced from said tubular inlet end and connected to said exhaust pipe, the other end of said second outer shell being in spaced surrounding relation to said tubular outlet end for defining an atmospheric supplementary air inlet of a supplementary air conduit for adding atmospheric air to the exhaust gases flowing through said converter section, said supplementary air conduit having an intermediate portion defined by the outer periphery of said converter section first outer shell and said second outer shell and a discharge end upstream of said converter section within said exhaust gas inlet for flow with the exhaust gases into said tubular inlet end of said converter section.

2. A catalytic converter for the exhaust gases of an internal combustion engine as set forth in claim 1 further including baffles provided between said first and second outer shells for causing a serpentine air flow of the atmospheric air through the intermediate portion of said supplementary air conduit before being introduced to the converter section.

3. A catalytic converter for the exhaust gases of an internal combustion engine as set forth in claim 1 wherein the outlet end of the supplementary air conduit terminates in a venturi section formed within said second outer shell exhaust gas inlet.

4. A catalytic converter for the exhaust gases of an internal combustion engine as set forth in claim 1 further including an exhaust silencer positioned within the first outer shell for silencing the exhaust gases.

5. A catalytic converter for-the exhaust gases of an internal combustion engine as set forth in claim 4 wherein the exhaust silencer is positioned downstream of the converter section.

6. A catalytic converter for the exhaust gases of an internal combustion engine as set forth in claim 4 further including baffles provided between said first and said second outer shells for causing a serpentine air flow of the atmospheric air through the intermediate portion of said supplemental air conduit before being introduced to the converter section.

7. A catalytic converter for the exhaust gases of an internal combustion engine as set forth in claim 3 further including a further catalytic converter section positioned upstream of the second outer shell exhaust gas end and within the exhaust pipe.

8. A catalytic converter for the exhaust gases of an internal combustion engine as set forth in claim 7 further including an exhaust silencer positioned within the first outer shell for silencing the exhaust gases.

9. A catalytic converter for the exhaust gases of an internal combustion engine as set forth in claim 8 wherein the silencer is comprised of an inner pipe comprising the tubular outlet end and the first outer shell and an outer pipe sealed at opposite ends to said inner pipe, a plurality of perforations in said inner pipe, and a sound deadening material between said inner and said outer pipes.

10. A catalytic converter for the exhaust gases of an internal combustion engine as set forth in claim 9 wherein the outer pipe of the silencer is disposed inwardly of the first outer shell and is supported thereby by at least one baffle having openings formed therein.

* * * * *